United States Patent
Liang

[15] 3,661,035
[45] May 9, 1972

[54] FOUR-SPEED RATIO PLANETARY TRANSMISSION

[72] Inventor: Po-Lung Liang, Livonia, Mich.
[73] Assignee: Ford Motor Company, Dearborn, Mich.
[22] Filed: Nov. 17, 1970
[21] Appl. No.: 90,303

[52] U.S. Cl. ................................................74/763
[51] Int. Cl. ............................................F16h 57/10
[58] Field of Search ..............................74/763, 759

[56] References Cited

UNITED STATES PATENTS

| | | | |
|---|---|---|---|
| 2,518,824 | 8/1950 | Simpson | 74/763 |
| 2,822,706 | 2/1958 | Miller | 74/763 |
| 2,873,624 | 2/1959 | Simpson | 74/759 |
| 3,339,431 | 9/1967 | Croswhite | 74/763 X |
| 3,426,617 | 2/1969 | Tosi | 74/763 X |
| 3,523,468 | 8/1970 | Kepner | 74/763 X |

Primary Examiner—Carlton R. Croyle
Assistant Examiner—Thomas C. Perry
Attorney—John R. Faulkner and Donald J. Harrington

[57] ABSTRACT

A power transmission mechanism for an automotive vehicle driveline having four forward driving speed ratios and a single reverse speed ratio comprising three simple planetary gear units and clutch and brake means for controlling the relative motion of the elements of the gear units, one gear unit acting as a torque multiplier for the other two gear units and a common reaction brake for the torque multiplier gear unit and the other two gear units during operation in each forward underdrive ratio as well as during reverse drive.

4 Claims, 2 Drawing Figures

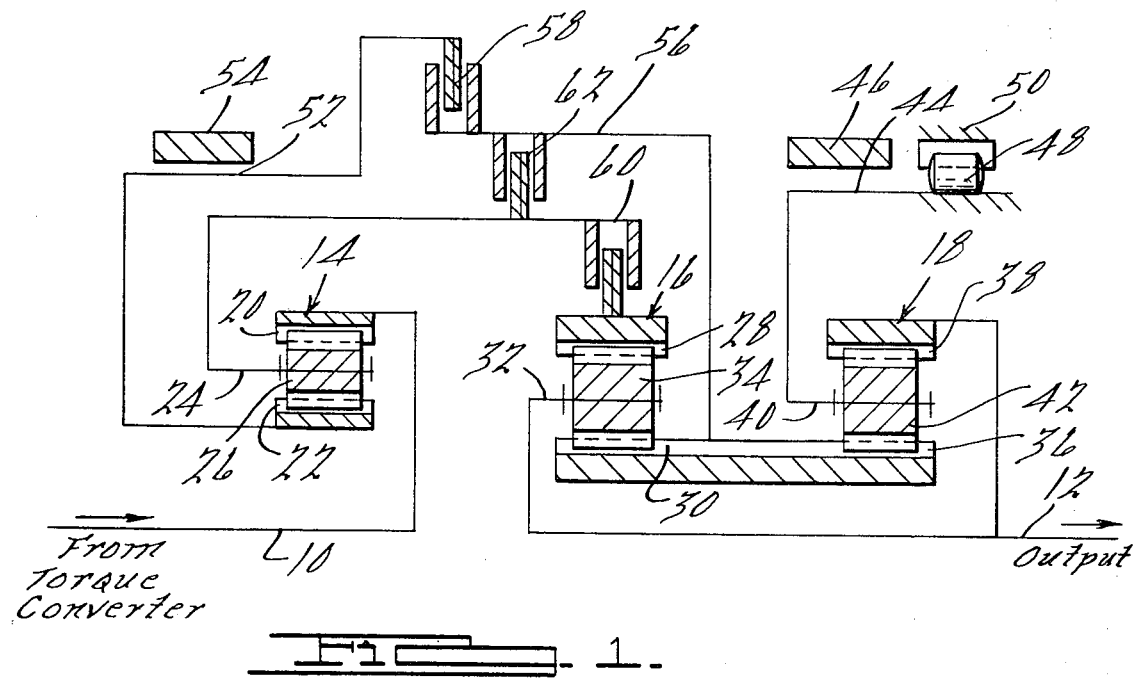

FOUR-SPEED RATIO PLANETARY TRANSMISSION

BRIEF DESCRIPTION OF THE INVENTION

My invention comprises improvements in a transmission adapted to be used in an automotive vehicle driveline with an internal combustion engine for delivering driving torque from the vehicle engine to the traction wheels. It includes the features that are common to co-pending application Ser. No. 111,997, filed in my name and in the name of Larry A. Kepner on Feb. 2, 1971.

The improvements of my invention, as well as the structure of the co-pending application, comprises two simple planetary gear units similar to the so-called Simpson gear arrangement in use in contemporary automotive vehicles. My invention includes also a third gear unit in structural cooperation with two other torque ratio changing gear units to provide an additional forward driving ratio and to provide also increased torque multiplication during operation in each underdrive ratio as well as during reverse drive. The torque multiplier gear unit is located between the engine and the other two simple planetary gear units of the mechanism. A reaction brake used for anchoring a reaction element of the torque multiplier gear unit is used also as a reaction point for the torque ratio changing gear unit.

The relative motion of the elements of the gear units is controlled with a minimum number of friction clutches and brakes. Only a single overrunning clutch is used to complement the braking action of the low speed ratio friction brake.

The change in ratio that occurs during ratio changes between the highest or fourth speed ratio and the third forward driving speed ratio is desirably low compared to the corresponding shift in four speed ratio drive systems of known construction. The magnitude of the torque ratio during operation in the lowest speed and during reverse drive is relatively high notwithstanding the relatively small ratio step between the third and the fourth ratios. These characteristics are desirable in an automotive vehicle driveline with an internal combustion engine, especially when the engine operating speed ranges are relatively high as is the case with vehicles having low displacement engines.

BRIEF DESCRIPTION OF THE FIGURES OF THE DRAWING

FIG. 1 is a schematic representation of the gear elements of my improved driveline.

FIG. 2 is a chart showing the clutch and brake engagement and release pattern as well as typical ratios that can be obtained.

PARTICULAR DESCRIPTION OF THE INVENTION

In FIG. 1 reference character 10 designates a power input shaft for the transmission mechanism. It may be connected drivably to the turbine of a hydrokinetic torque converter, the impeller of which is connected to the crankshaft of an internal combustion engine, not shown. Numeral 12 designates a power output shaft which may be connected to the vehicle traction wheels through a driveshaft and a differential-and-axle assembly.

The transmission mechanism includes three simple planetary gear units. This is indicated separately by reference characters 14, 16 and 18. Gear unit 14 includes a ring gear 20, sun gear 22, carrier 24 and planet pinions 26, the latter being journaled rotatably on the carrier 24 in meshing engagement with the ring gear 20 and the sun gear 22.

Gear unit 14 is situated at the forward side of the gear system between the engine and the other two gear units 16 and 18.

Gear unit 16 includes a ring gear 28, sun gear 30, carrier 32 and planet pinions 34. Carrier 32 is connected directly to the power output shaft 12. Sun gear 30 is connected directly to sun gear 36 of the gear unit 18. Ring gear 38 of the gear unit 18 is connected directly to the power output shaft 12. Carrier 40 of the gear unit 18 journals pinions 42 which mesh with the ring gear 18 and the sun gear 36. Carrier 40 is connected to brake drum 44 about which brake band 46 is positioned. Brake band 46, when applied to the drum 44, establishes a torque reaction point for the carrier 40. Brake drum 44 is anchored also by an overrunning brake 48 which is arranged to distribute reaction torque from the carrier 40 during forward drive operation directly to the transmission housing 50. Freewheeling motion of the brake 48 is permitted when the reaction torque is reversed.

Sun gear 22 of the gear unit 14 is connected to brake drum 52. Brake band 54 surrounds the drum 52 during operation in each underdrive ratio as well as during reverse drive operation. Brake drum 52 can be clutched directly to drive shell 56 through a selectively engageable friction clutch 58. When clutch 58 is applied, sun gears 30 and 36 may be anchored by the brake band 54 when the latter is applied. This condition occurs when the transmission is in condition for operation in a second underdrive ratio. Clutch 58 is applied and brake 54 is released during operation in the fourth direct drive ratio.

Carrier 24 for the torque multiplier gear unit 14 may be clutched to ring 28 of the gear unit 16 through a selectively engageable friction clutch 60. Clutch 60 is applied during operation in each of the forward driving speed ratios. The torque input side of the clutch 60, which is connected, as explained above to the carrier 24, may be connected directly to drive shell 56 and the sun gears 30 and 36 through a third selectively engageable friction clutch 62. Clutch 62 is applied during operation in the third and fourth forward driving ratios.

The operating sequence for the clutch and the brakes is illustrated in the chart in FIG. 2. During operation in the low speed ratio, clutch 60 and brake 54 are applied. The input torque delivered by shaft 10 is multiplied by the gear unit 14 as the sun gear 22 acts as a reaction member. The torque shaft from the carrier 24 of the gear unit 14 is distributed to the input ring gear 28 through the applied clutch 60. This causes a forward driving torque to be applied to the carrier 32 and the output shaft 12. The reaction torque for gear unit 16 causes sun gears 30 and 36 to rotate in reverse direction with the overrunning clutch 48 anchoring the carrier 40. The reverse motion of the sun gear 36 causes forward driving torque to be applied to the ring gear 38 and the output shaft 12.

During operation in the second forward driving speed ratio, brake 54 continues to be applied thereby causing the torque multiplier gear unit 14 to remain active. Clutch 58 now is applied, however, thereby causing the sun gear 30 to be anchored to the brake 54. Overrunning clutch 48 now freewheels and gear unit 18 becomes inactive. The output torque of carrier 24 of the gear unit 14 then is multiplied by the gear unit 16, and the output torque 32 drives the output shaft 12 without a torque contribution from the gear unit 18.

Both clutches 60 and 62 are applied to establish a third forward driving speed ratio. Thus the elements of the gear units 16 and 18 are rotated in unison as the gear unit 14 continues to multiply torque delivered to the gear system through shaft 10. Gear unit 14 now is the only torque multiplier.

All the friction clutches 58, 62 and 60 are applied and the brake bands are released to establish direct-drive, fourth speed ratio operation. In this case all the elements of the gear units 14, 16 and 18 are rotated in unison to establish a 1:1 ratio.

Hill braking operation in the lowest speed ratio is achieved by applying brake 46. A reverse torque applied to the carrier 40 during hill braking operation then is distributed to the casing through the brake 46, since reverse reaction torque cannot be accommodated by the overrunning brake 48.

Reverse drive is achieved by applying clutch 62 and brake band 46 as well as brake band 54. Gear unit 14, with the sun gear 22 acting as a reaction member, multiplies torque as it does during forward drive operation. The output torque in the carrier 24 is distributed directly to the sun gear 36 through the engaged clutch 62. This causes reverse motion of the ring gear 38 as the carrier 40 acts as a reaction point. The output shaft 12 follows the motion of the ring 38.

What I claim and desire to secure by U.S. Letters Patent is:

1. A planetary gear system for use in an automotive vehicle driveline comprising three simple planetary gear units adapted to deliver driving torque from a driving shaft to a driven shaft, each gear unit comprising a ring gear, a sun gear, a carrier, planet pinions journaled rotatably on the carrier in meshing engagement with the sun and ring gears, the first and second of said gear units having sun gears connected together for rotation in unison, the third of said gear units being located between the driving shaft and the first of said gear units, the carrier of said first gear unit and the ring gear of said second gear unit being connected to said driven shaft, brake means for anchoring the carrier of said second gear unit to establish a reaction point during operation in the lowest forward-driving speed ratio, second brake means for anchoring the sun gear of the said third gear unit during operation in each forward underdrive ratio, the ring gear of said third gear unit being connected to said driving shaft, first clutch means for connecting the carrier of said third gear unit to the ring gear of said first gear unit during operation in each forward driving ratio, second clutch means for connecting the sun gears of said first and second gear units to said second brake means thereby providing a reaction point for said gear system during operation in the second lowest underdrive ratio, and third clutch means for connecting together two gear elements of said first and second gear units during operation in the third and fourth forward driving speed ratios, said second clutch means being applied also during operation in the fourth forward driving speed ratio thereby establishing a 1:1 torque ratio.

2. The combination set forth in claim 1 wherein said first brake means includes a friction brake in which the braked element thereof is connected to the carrier of said second gear unit, said first brake means being applied during operation in reverse drive and said third clutch means being applied during reverse drive thereby developing a reverse torque on the ring gear of said second gear unit, said second brake means being applied during reverse drive to multiply the torque delivered to the sun gear of said second gear unit during reverse drive.

3. The combination set forth in claim 1 wherein said third clutch means comprising relatively movable clutch elements adapted to be connected together when the clutch means is applied, one clutch element being connected to the carrier of said third gear unit and the other clutch element being connected to the sun gears for said first and second gear units.

4. The combinations set forth in claim 2 wherein said third clutch means comprising relatively movable clutch elements adapted to be connected together when the clutch means is applied, one clutch element being connected to the carrier of said third gear unit and the other clutch element being connected to the sun gears for said first and second gear units.

* * * * *